United States Patent [19]

Gilloire et al.

[11] Patent Number: 4,956,838

[45] Date of Patent: Sep. 11, 1990

[54] ECHO CANCELLING DEVICE WITH FREQUENCY SUB-BAND FILTERING

[75] Inventors: André Gilloire, Lannion, France; Martin Vetterli, New York, N.Y.

[73] Assignee: ETAT Francais représenté par le Ministre des postes, Télécommunications et de l'Espace (Centre National d'Etudes des Télécommunications), Issy les Moulineaux, France

[21] Appl. No.: 322,947

[22] Filed: Mar. 14, 1989

[30] Foreign Application Priority Data

Mar. 15, 1988 [FR] France .................. 88 03341

[51] Int. Cl.$^5$ .............................. H04B 3/23
[52] U.S. Cl. .................... 370/32.1; 379/388; 379/410
[58] Field of Search ............... 379/388, 390, 406, 409, 379/410, 411; 370/32, 32.1

[56] References Cited

U.S. PATENT DOCUMENTS

| | | | |
|---|---|---|---|
| 4,564,934 | 1/1986 | Macchi | 370/32.1 |
| 4,644,108 | 2/1987 | Crouse et al. | 379/406 |

FOREIGN PATENT DOCUMENTS

| | | | |
|---|---|---|---|
| 0122340 | 6/1987 | Japan | 379/410 |
| 0125722 | 6/1987 | Japan | 379/410 |
| 0163424 | 7/1987 | Japan | 379/406 |

Primary Examiner—Jin F. Ng
Assistant Examiner—Magdy Shehara
Attorney, Agent, or Firm—Fleit, Jacobson, Cohn, Price, Holman & Stern

[57] ABSTRACT

An echo cancelling device for use between a line receiving an incoming signal and a line transmitting an outgoing signal, for cancelling out echo, comprising a plurality of processing channels connected in parallel relation and assigned to successive mutually adjacent sub-bands of the spectral band of the outgoing signal, each channel having: a first analysis band-pass filter receiving the echo-affected signal to be transmitted, whose output is connected to the additive input of a subtractor; a second analysis band-pass filter, identical to the first filter, receiving the incoming signal and feeding an adaptive filter delivering an estimated echo value in the sub-band to the subtractive input of the subtractor; and a synthesis filter, symmetrical with the analysis filters and whose output feeds the transmission line. Each processing channel receives an estimation of the aliasing component originating from another sub-band at least and that component is eliminated by adding it to the signal originating from the filter analyzing the respective incoming signal. Estimation may be made by synthesis using at least one adaptive cross-filter fed by the output of an adjacent channel.

9 Claims, 3 Drawing Sheets

ECHO CANCELLING DEVICE WITH FREQUENCY SUB-BAND FILTERING

BACKGROUND OF THE INVENTION

1. Technical Field

The present invention relates to echo cancelling devices for use in signal transmission installations for full duplex transmission. It finds a particularly important application in telephony for solving problems raised by teleconference installations and so-called "free hand" telephone sets or at least having amplified listening. These problems are formed by danger of Larsen effect and the existence of an echo of acoustic origin.

The origin of such phenomena appears in FIG. 1 which shows, with continuous lines, the general diagram of a teleconference terminal. The signals x entering through a reception line LR and coming from a remote terminal 8 are amplified by an amplifier 10 and then broadcast in a listening hall by a loud-speaker 12. In the listening hall, the sound waves coming from the speaker whose speech is to be transmitted and from the loud-speaker 12 through acoustic coupling (shown schematically by a channel 13) are picked up by one or more microphones 14. Microphone 14 is connected to an amplifier 16 and the output signal y thereof is transmitted over the send line LE to the remote terminal. A listener-speaker placed at the remote terminal 8 will consequently hear not only the speech which is intended for him, but also an echo of his own speech with a delay proportional to the length of the lines LE and LR, perturbated by the transfer function of the acoustic channel 13. This echo is all the more troublesome the higher its level and the longer the delay. In satellite transmission, the delay may reach 600 ms and considerably disturb intelligibility. The Larsen effect occurs when the coupling formed by channel 13 is sufficiently tight for the gain in the loop formed of the two terminals and the lines exceeds 1.

2. Prior Art

Different devices have already been used for dealing with the acoustic echo and the Larsen effect, particularly automatic amplification gain controllers or echo cancelling devices in each terminal or "free hands" set.

The gain varying devices operate by introducing attenuation before the loud-speaker or after the microphone, depending on the detected communication direction. These devices have the drawback of producing a subjective impression of speech cut-off when the degree of inserted attenuation is high. Now, a high attenuation is necessary when the communication installations in which the delay is large and in which the echo must be greatly attenuated so as to remain tolerable.

The invention relates to echo cancelling devices for directly dealing with the echo by compensating for it by means of an equivalent signal and of opposite direction. For that, an echo cancelling device comprises an adaptive filtering device connected to the incoming signal input line for delivering an estimation of the echo of the signal received at the subtractive input of the subtractor which receives, at its additive input, the useful signal affected by the echo.

The principle of such a device is shown with broken lines in FIG. 1. The echo canceller comprises an adaptive filtering device FA which receives the incoming signal x and whose output feeds the subtractive input of a subtractor 18 whose additive input is connected to the output of the amplifier 16. The coefficients of filter FA are adapted automatically responsive to the signal e delivered to the line, equal to the difference between the echo-affected signal y of amplifier 16 and the estimated echo. The algorithm for adaptation of the coefficients of filter FA must be such that the filter models the characteristics of the acoustic coupling channel 13, formed by the beginning of the impulse response of this channel.

In the absence of speech from a speaker placed in the hall, the outgoing signal delivered to line LE is then reduced to an echo residue. When a speaker speaks in the hall in front of microphone 14, his speech is transmitted to a line LE without being attenuated or modified. Often, a device (not shown) is provided for detecting the presence of the speech signal coming from a speaker (for example by level detection) and for then momentarily blocking adaptation of filter FA so as to avoid any disturbance of the filter by the speech of the local speaker.

This solution has the great advantage, over automatic gain control of making bidirectional operation possible without attenuation of the useful signals, but presently existing devices which apply it are not entirely satisfactory, for their construction comes up against two main difficulties.

In the case of telephone installations, the acoustic echo cancellers comprise transversal adaptive digital filters operating at a sampling frequency from 8 to 16 kHz. Now, the impulse response of channel 13 is often very long and it corresponds to several thousands of coefficients at this sampling frequency. The computations to be carried out at each sampling time (filtering by convolution and adaptation of the coefficients of the filter) require a huge volume of operations. For carrying them very rapidly, numerous and expensive electronic circuits are indispensable.

The characteristics of the acoustic coupling channel 13 are time-variable, for example when a person moves in the listening hall. Theoretical reasons, related to the spectrum of the signal received over line LR and to the required length of the adaptive filter, limit the ability to track these variations (which must be taken immediately into account to avoid the untimely reappearance of the echo) and the initial convergence rate.

To overcome these problems an echo cancelling device has been proposed which is inserted between the line receiving the incoming signal and the line transmitting the outcoming signal so as to cancel out the echo, of the type comprising a plurality of processing channels assigned to successive adjacent sub-bands of the spectral band of the outgoing signal, each channel having:

a first analysis band-pass filter receiving the echo-affected signal to be transmitted, whose output is connected to the additive input of a subtractor;

a second analysis band-pass filter, identical to the first filter, receiving the incoming signal and feeding an adaptive filter delivering an estimated echo value in the sub-band to the subtractive input of the subtractor; and a synthesis filter, symmetrical with the analysis filters and whose output feeds the transmission line.

Such a device is described for example in the article "Kompensation akustischer Echos in Frequenzteilbänden", Walter Kellermann, Frequenz, Vol. 39 (1985) No. 7-8, pp. 209-215. The general diagram of such a device is shown in FIG. 2. The signal x from line LR is fractionated by a bank of M analysis filters BFAR into M frequency sub-bands, usually all having the same width.

The amplified signal y from the microphone is fractionated into M sub-bands $1, \ldots, k, \ldots, M$ by a bank of analysis filters BFAM identical to bank BFAR. In each sub-band of serial number k, an adaptive filter $FA_k$ is fed by the incoming signal $x_k$ and its output is subtracted by subtractor $S_k$ from the signal $y_k$ delivered by the analysis bank BFAM. As in the conventional canceller of FIG. 1, the adaptive filter $FA_k$ is adjusted so as to minimize the power of the signal $e_k$ at the output of subtractor $S_k$.

Adaptation of the coefficients, shown schematically on FIG. 2 by an oblique arrow, is provided by a specific circuit using a conventional algorithm which will generally be the gradient algorithm although, in some cases, a simpler algorithm may be adapted, for example the sign algorithm, or another adaptation algorithm, for example the least squares algorithm.

The M signals $e_1, \ldots, e_k, \ldots, e_M$ feed a bank of synthesis filters BFS which rebuilds the full band signal sent as outgoing signal to the transmission line LE.

The device has several advantages compared with a conventional echo cancelling device, whose band is not fractionated:

The volume of computations to be effected per unit of time is considerably reduced since the signals in each sub-band can be sub-sampled: if Fe is the sampling frequency thought necessary for the full band signal, each of the M sub-bands of spectral width Fe/2M may theoretically be sub-sampled at its critical decimation frequency Fe/M. The volume of computations for the same impulse response time is theoretically divided by M, for the computation load in the analysis and synthesis filter banks is negligible as compared with the computations to be carried out in the adaptive filters.

In each sub-band k, the adaptation gain of the algorithm used may be optimized as a function of the power of signal $x_k$ in the band, which increases the convergence rate and the ability to track variations in the acoustic channel.

But these theoretical gains cannot be completely obtained in practice. A complete study of such a device A. Gilloire, Experiments with sub-band acoustic echo cancellers for teleconferencing, Proc. ICASSP-87, April 1987, Dallas, pp. 2141–2144) has shown that in fact it is not possible to adopt the critical decimation frequency if the sub-bands are directly adjacent. In fact, sub-sampling at the critical decimation frequency, required for reducing the computation volume as much as possible, cannot be used without causing spectrum aliasing to appear, at the frontiers between sub-bands, which are not cancelled by the adaptive filters. That leads either to using mutually separate sub-bands (without overlap), but with the drawback of introducing gaps in the spectrum of the signal reconstituted at the output of the synthesis banks BSF (which adversely affects the quality of speech when the number of sub-bands is high), or to sub-sampling the sub-bands at a frequency higher than the critical decimation frequency so as to form guard bands avoiding aliasing, which increases the computation speed required in the adaptive filters.

SUMMARY OF THE INVENTION

An object of the invention is to provide an echo cancelling device which is improved particularly in that it eliminates to a large extent the problem of spectrum aliasing. For that purpose, the invention provides a device of the above-defined type, wherein each processing channel is provided with means for extracting by filtering, for the respective sub-band, the aliasing component originating from another sub-band for eliminating said component by adding it to the signal originating from the filter analyzing the respective incoming signal.

In practice, this result will generally be obtained by forming said means as at least one adaptive cross-filter fed by the output of at least one adjacent channel. If the sub-band analysis filters are sufficiently selective, it will often be sufficient to provide a channel of order k with two cross-filters each using as input the output signals from the adjacent channels of order $k-1$ and $k+1$ (or of a single one for channels 1 and M). If, however, such selectivity is insufficient, more than two cross-filters may be assigned to each channel.

The cross-filters may often be factorized into a fixed part, depending solely on the characteristics of the analysis and synthesis filter banks, and an adaptive part. The increase in computation volume is small and the overall reduction of this volume with respect to the full band conventional canceller is maintained in a ratio which may practically be as high as the number of sub-bands.

The invention will be better understood from the following description of embodiments, given by way of explanation and in no way limitative. The description refers to the accompanying drawings.

DETAILED DESCRIPTION OF PREFERRED EMBODIMENTS

Figure 1:
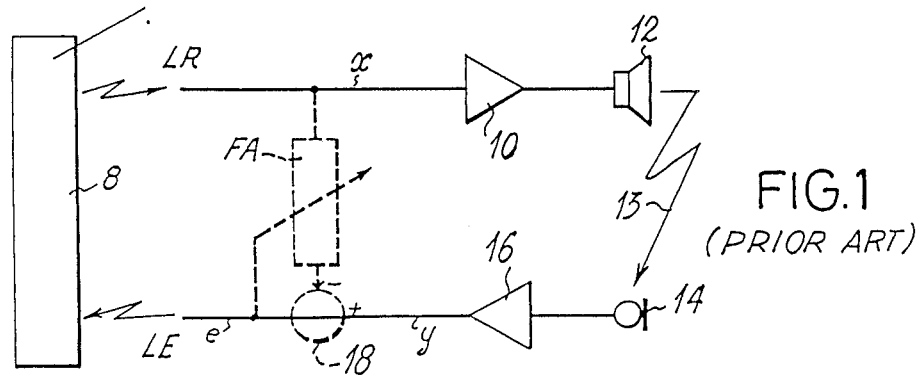
FIG. 1, already described, is a block diagram of a teleconference installation equipped with a conventional echo canceller device, shown with broken lines.
Figure 2:
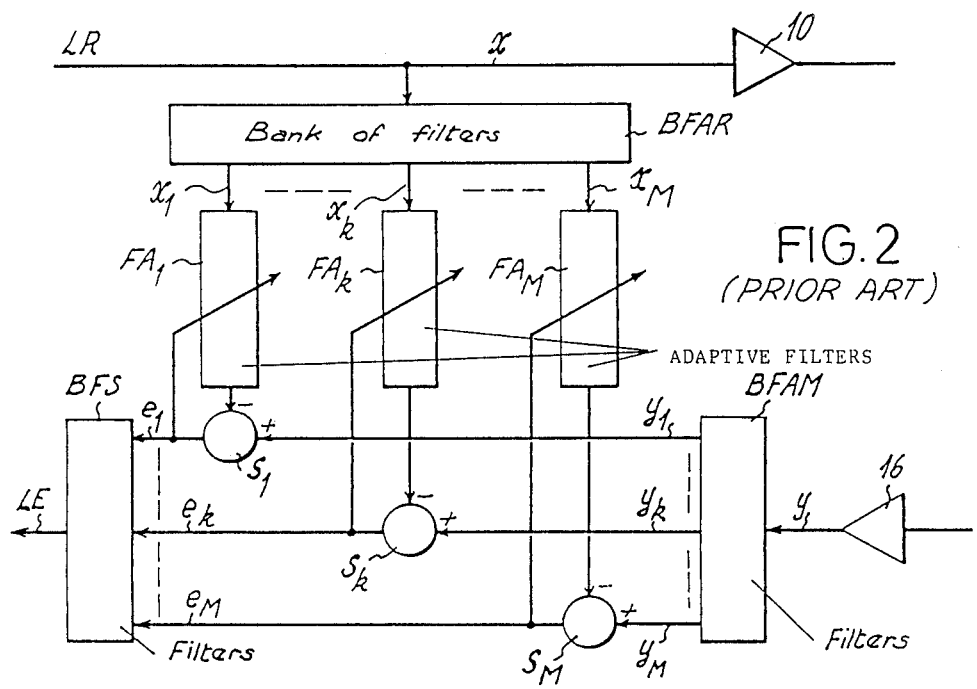
FIG. 2, already described, is a block diagram of a frequency sub-band echo canceller device.
Figure 3:
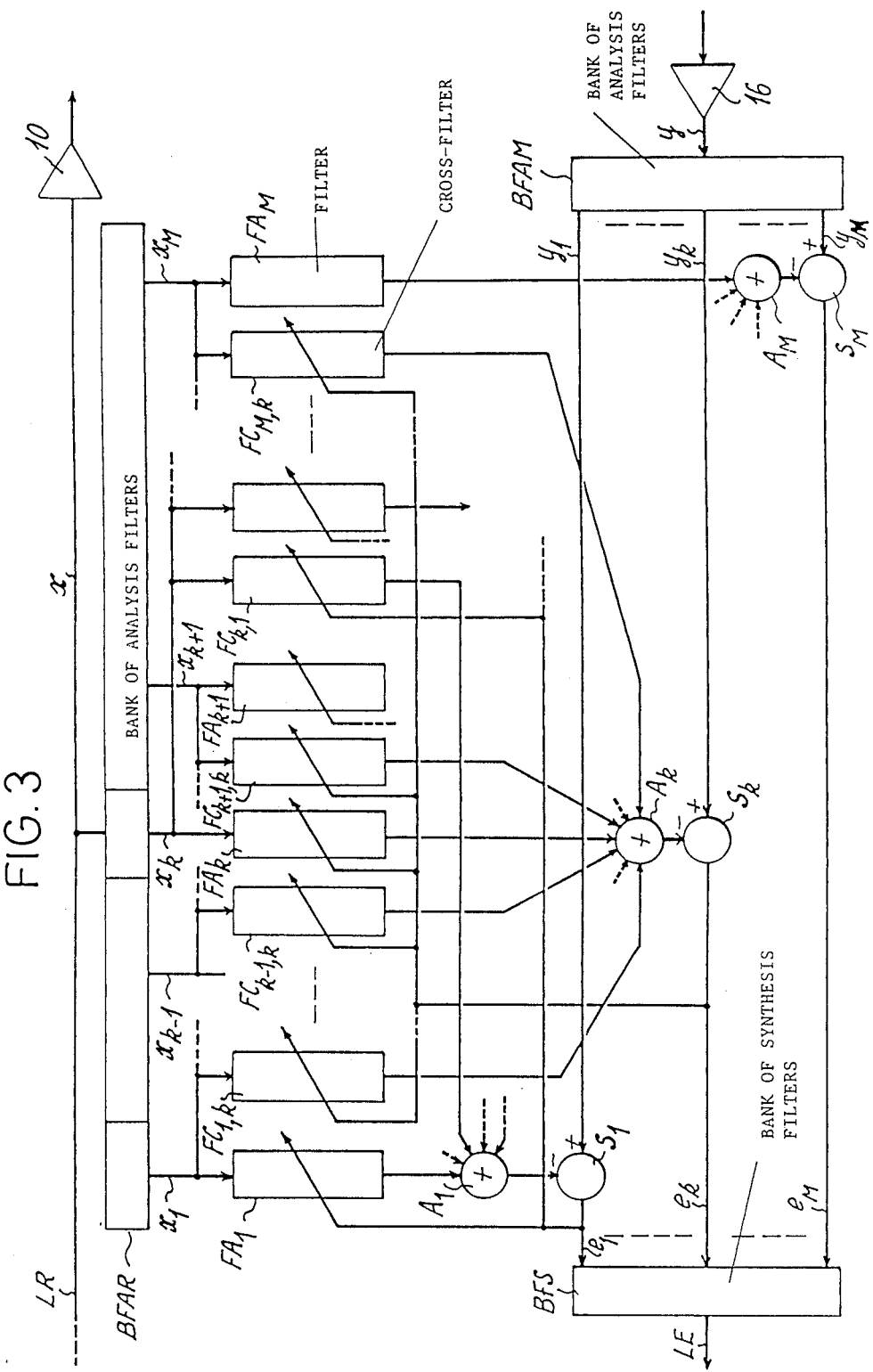
FIG. 3 is the general diagram of a device forming one example of implementation of the invention, a single channel being shown completely.

The device shown schematically in FIG. 3, in which the elements corresponding to those of FIG. 2 bear the same reference, again comprises a bank BFAM of M analysis filters receiving the echo-affected output signal y from amplifier 16, and a bank BFAR for analyzing the incoming signal x arriving over the reception line LR. The two filter banks are identical. The output $y_k$ of BFAM is applied to the additive input of the subtractor $S_k$ which outputs signal $e_k$ applied to the corresponding filters of the synthesis filter bank BFS feeding the transmission line LE. The signals in each sub-band are decimated (sub-sampled) in the ratio M within the analysis banks BFAM and BFAR.

The output of filter $FA_k$ is not applied directly to the subtractive input of subtractor $S_k$. It is first of all added to the output of cross-filters $FC_{1,k}, \ldots, FC_{k-1,k}, FC_{k+1,k}, \ldots, FC_{M,k}$. The device consequently comprises, for each channel k, an adder $A_k$ receiving the output of the corresponding filter $FA_k$ and that of the associated cross-filters. The coefficients of all cross-filters contributing to the formation of the output signal of adder $A_k$ are adjusted by circuits whose input signal is formed by the output $e_k$ of the subtractor. For the cross-filters $FC_{2,1}, \ldots, FC_{k,1}, \ldots, FC_{M,1}$, the coefficients will be adjusted in response to the component $e_1$ of the outgoing signal, etc.

Figure 5:
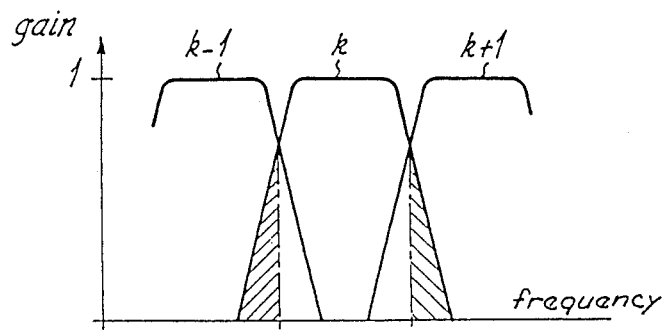
FIG. 5 shows a possible form of the sub-bands in the case of the modification described in FIG. 4.

The device shown in FIG. 3 requires each channel to comprise, in addition to the adaptive filter FA, $M-1$ cross-filters FC. But, in practice, the aliasing bands at the low and high limits of a sub-band of order k often do not extend as far as the end sub-bands, of orders 1 and M and that makes it possible to reduce the number of cross-filters. Such reduction may be all the greater the more selective the filters of banks BFAR and BFAM. If so-called quadrature mirror filters (QMF) or pseudo-QMF filters are used, the aliasing bands corresponding to a channel may often be limited to a range which does not extend beyond the two adjacent channels. FIG. 5 shows, by way of example, the gain variation as a function of the frequency which can be obtained with QMF filters: the gain becomes practically zero, for the filter of order k of the bank, well before the central frequency of the adjacent sub-bands. The QMF and pseudo-QMF filters have the property of providing a 3 dB gain at the cut-off frequency and an overall response of the filter bank which is flat, i.e. without modification of the frequency spectrum.

Figure 4:
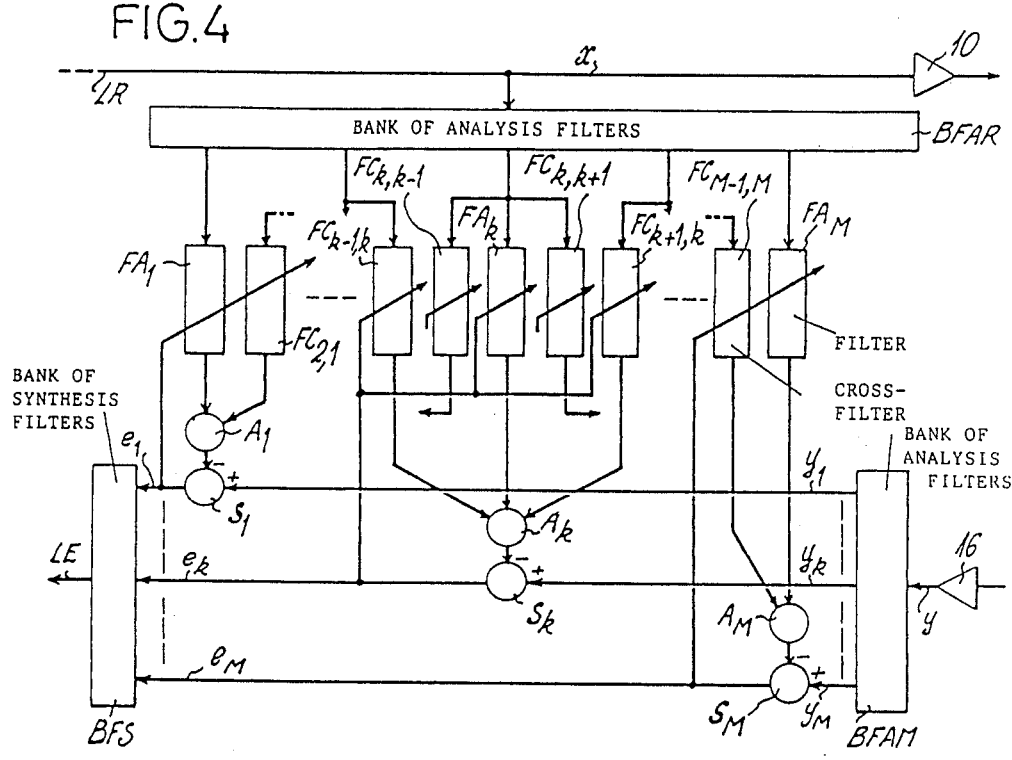
FIG. 4 illustrates a modification of the invention, in which only the cross-filters from the bands directly adjacent to a given channel are kept.

In this case, the device may be greatly simplified. As shown in FIG. 4, it is sufficient to provide two cross-filters $FC_{k-1,k}$ and $FC_{k+1,k}$ for channel k (and even a single one, $FC_{2,1}$ or $FC_{M-1,M}$, for the end channels 1 or M). It can be seen in FIG. 4 that the output of the filter corresponding to the sub-band of order k of the analysis bank BFAR feeds the input of the main adaptive filter $FA_k$ and the inputs of two cross-filters only $FC_{k,k-1}$ and $FC_{k,k+1}$. The adder $A_k$ with three inputs receives the output of the main filter $FA_k$ and the outputs of the cross-filters $FC_{k-1,k}$ and $FC_{k+1,k}$: the output of $A_k$ is subtracted from the signal of the sub-band k, delivered by the bank of filters BFAM, by the subtractor $S_k$.

. The adaptive filters FA and the cross-filters FC may have any one of numerous known constructions. Filters may be used employing the algorithm of the gradient frequently used in transverse adaptive filters. A filter using the least squares search algorithm gives even better results, at the price of greater computing complexity. In some cases again, it is sufficient to use the sign algorithm. For a description of such filters, of their operation and their respective advantages, reference may be made to different documents, for example to the article by O. Macchi et al "Le point sur le filtrage adaptatif transverse", 11th colloque GRETSI, Nice, June 1987, pp. 1G-14G and to U.S. Pat. No. 4,564,934 (Macchi).

Figure 6:
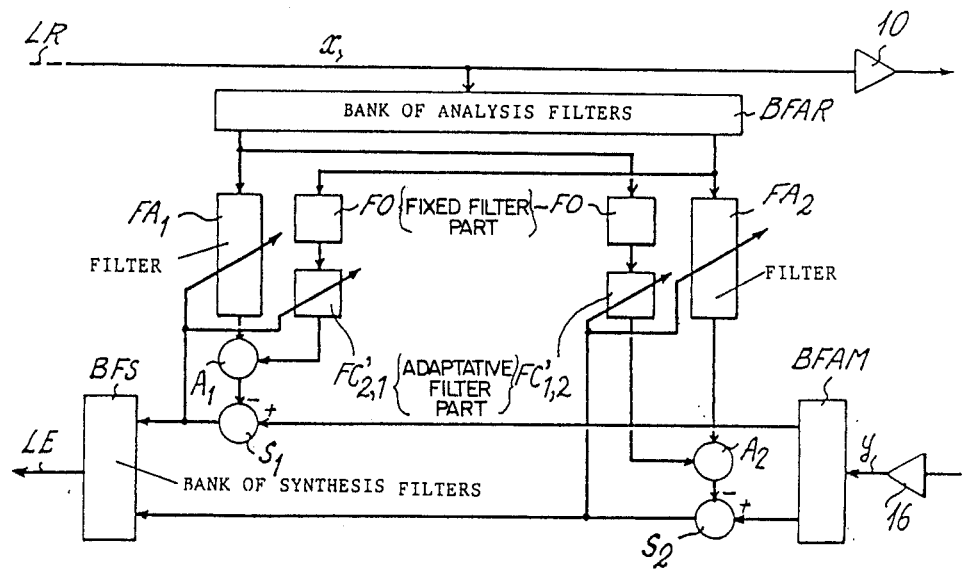
FIG. 6 illustrates an embodiment of the invention, in which the cross-filters are factorized as a fixed part and an adaptive part.

An advantageous solution consists in adopting, for the cross-filters, a special structure shown in FIG. 6 in the particular case of fractionation into two sub-bands. Each of the cross-filters is factorized into a fixed part OF and an adaptive part FC". The part FO is equal to the convolution product of the two filters forming each analysis bank decimated with a ratio of 1:2. In this case of two sub-bands, the filters of the banks BFAR and BFAM are a low-pass filter for a bank, and a high-pass filter for the other bank.

The same construction of the cross-filters could be transposed to the embodiments shown in FIG. 3 and FIG. 4.

Fractionation into sub-bands will be made in each case taking into account the characteristics of the transmission installation.

The simplest solution, usable in telephony, consists in using two bands in the ranges of respectively from 0 to 4000 Hz and from 4000 to 8000 Hz. A solution which is slightly more complex, again using sub-bands of equal width, consists in splitting the whole band into four sub-bands each of 2000 Hz or into eight sub-bands each of 1000 Hz.

In some cases, however, it will be of advantage to use sub-bands of unequal width. But in this case, the correction terms must be adapted to the correct sampling frequency for each sub-band.

In each case, the number of cross-filters used for each sub-band is selected in dependance of the number of sub-bands for which overlap occurs. In the case, for example, of a structure with eight equal sub-bands of 1000 Hz in width, the overflows from a sub-band to adjacent sub-bands must not exceed 1000 Hz. This result may be readily obtained using efficient filter banks whose complexity however remains limited, for example with 64 or 96 coefficients.

By way of example, the characteristics will now be given which can be used for a typical device, for a sampling rate of 16 kHz, required for transmission of speech over a wide band (up to 7 kHz). To provide a device operating at 16 kHz and intended to identify the first 62 milliseconds of the impulse response of the acoustic coupling channel 13, an arrangement as shown in diagrammatic form in FIG. 6 is used. Each sub-band is sub-sampled at 8000 Hz. Each main filter FA1 or FA2 has a length of 500 coefficients. Each cross-filter has a fixed part FO of length 32 (for filter banks constructed from a low-pass prototype of 32 coefficients) and an adaptive part FC" with 160 coefficients, i.e. about one third of the length of the main filters, such length being sufficient in practice.

The adaptive filters are all adjusted by means of a stochastic gradient algorithm, the adaptation representing in this case as many computations as the convolution. The volume of computations to be carried out for each pair of input samples is then:

$$2*(2*500+2*160)+2*32+3*32=2800$$
multiplications-summations.

This figure is to be compared with 4000 multiplications-summations which a conventional canceller must carry out for processing a pair of samples.

In a second application which is also typical, in which the device must again operate at the sample frequency of 16 kHz but must identify the first 126 milliseconds of the impulse response of the acoustic coupling channel, a device of the kind shown in FIG. 3 is used. This device comprises $M=8$ sub-bands. Each sub-band is sub-sampled at 2000 Hz. Each main filter FA has a length of 250 coefficients and each cross-filter FC has a fixed part of 12 coefficients and an adaptive part of 84 coefficients. The analysis and synthesis filter banks are constructed from a low-pass prototype of 96 coefficients. The band corresponding to the highest frequencies (7000 to 8000 Hz) is not processed, for it contains signals of negligible power. It consists of the transition band of the anti-aliasing input filters, not shown in the Figures.

The volume of computations to be carried out for each block of 8 samples is then:

$$2*(7*250+12*84)+7*12+3*(96+56)=5856$$
multiplications-summations.

This figure is to be compared with the 32000 multiplications-summations which a conventional canceller must carry out for processing the same block of eight samples.

The invention is not limited to the particular embodiments which have been shown or described; these applications are not limited to telephony and to acoustic echoes. The echo cancelling device may also be used in data transmission installations for cancelling out the electric echoes on the line.

We claim:

1. An echo cancelling device for use between a line receiving an incoming echo-affected signal and a line transmitting an outgoing signal, for cancelling out echo, comprising a plurality of processing channels connected in parallel relation and assigned to successive mutually adjacent sub-bands of the spectral band of the outgoing signal, each of said channels comprising;

a subtractor circuit having an additive input and a subtractive input for delivering an output signal at an output;

an adaptive filter having an input and an output connected to the subtractive input of said subtractor circuit;

a first analysis band-pass filter receiving the incoming echo-affected signal, the output of said first band-pass filter being connected to the additive input of said subtractor circuit;

a second analysis band-pass filter, identical to the first band-pass filter, receiving the incoming echo-affected signal and feeding the input of said adaptive filter for delivering an estimated echo value in the sub-band of the corresponding channel to the subtractive input of the subtractor; and a synthesis filter connected to the output of said subtractor circuit for rebuilding the full band of said incoming echo-affected signal and whose output feeds the line transmitting the output signal, means for extracting through filtering for a particular sub-band, the aliasing component originating from another sub-band and for eliminating the aliasing component by adding it to the signal originating from the filter analyzing the incoming echo-affected signal corresponding to said particular sub-band.

2. The echo cancelling device according to claim 1, and further comprising at least one adaptive cross-filter connecting adjacent channels and fed by the output of at least one adjacent channel.

3. The echo cancelling device according to claim 2, wherein said processing channels are respectively assigned to first, intermediate and last mutually adjacent sub-bands of the spectral band of the outgoing signal, each of said processing channels, except the channels for the first and last sub-bands, receive, on inputs thereof, output signals from two adjacent sub-bands only.

4. The echo cancelling device according to claim 3, wherein the analysis band pass filters are quadrature mirror filters or pseudo-quadrature mirror filters.

5. The echo cancelling device according to claim 2, wherein each of said cross-filters comprises a fixed filter part, depending solely on the characteristics of the analysis and synthesis filters, and an adaptive filter part.

6. The echo cancelling device according to claim 1, wherein all of said sub-bands are of substantially equal frequency width.

7. The echo cancelling device according to claim 2, and comprising a plurality of adaptive cross-filters wherein particular ones of said cross-filters contribute to provide an estimation for a particular one of said channels and said particular ones of said cross-filters being adjusted by an algorithm which processes the output of the subtractor circuit of the particular channel as an input parameter.

8. The echo cancelling device according to claim 1, wherein all of said filters are constructed for adjustment by a gradient algorithm.

9. The echo cancelling device according to claim 1, wherein at least some of said filters are constructed for being adjusted by the least squares algorithm.

* * * * *